United States Patent Office 3,522,992
Patented Aug. 4, 1970

3,522,992
GEODETIC SURVEY SYSTEM AND DIGITAL PHASE-METER THEREFOR
Richard M. Jaffe, West Hollywood, Calif., assignor to North American Rockwell Corporation, El Segundo, Calif., a corporation of Delaware
Filed June 28, 1967, Ser. No. 649,689
Int. Cl. G01c 3/08
U.S. Cl. 356—5               13 Claims

ABSTRACT OF THE DISCLOSURE

Apparatus for measuring distance and changes thereof by means of measuring the phase of given signals. The phase-measuring circuitry comprises a phase-lock loop having an oscillator therein, for producing a primary comparison-signal and a phase-multiplied secondary comparison-signal; the comparison-signals being used to trigger a digital counter that measures the time-interval (phase-difference) between corresponding portions of said comparison-signals and a gating signal.

INTRODUCTION

In electronic circuitry, signals are frequently "in-step" with each other, or "out-of-step"; and at times this so-called "in-phase" or "out-of-phase" condition is very meaningful. Moreover, the "phase-difference" between signals often has a particular significance, and must be carefully measured an interpreted.

For many purposes, it is becoming increasingly important to measure ever-smaller phase-differences between electrical signals. Prior-art phase-measuring circuits have, in general, been limited to low-frequency signals, and/or to apparatus of low sensitivity.

One example of the need for precise measurement of small phase-differences occurs in the measurement of distances, especially when these distance measurements are to be made between a remotely-positioned location and a monitoring station. Prior-art distance-measuring methods have used surveying techniques and radar techniques, but present practices obtain higher accuracy by the use of a lightbeam from a laser. However, the ultimate accuracy of this latter approach is being limited by phase-measurement problems, and by the turbulence and non-homogeneity of the atmosphere through which the lightbeam is propagated.

The value of measuring distances and minute changes thereof may be realized from the fact that recent studies have shown that many earthquakes are preceded by minor movements of the earth's surface, these movements being particularly noticeable in the area of an earthquake "fault"; and indicating the buildup and/or releasing of earth stresses. It is therefore desirable to be able to measure these earth movements, hopefully to predict iminent earthquakes; and to discover how their effects may be minimized.

The system described herein is a variation of the system described in a copending patent application entitled, "Geodetic Laser Survey System," filed by V. Castellano et al. on June 28, 1967, Ser. No. 649,513, and assigned to the assignee of this application.

OBJECTS AND DRAWINGS

It is therefore an object of the present invention to provide improved equipment for distance and phase measurement.

Figure 1:
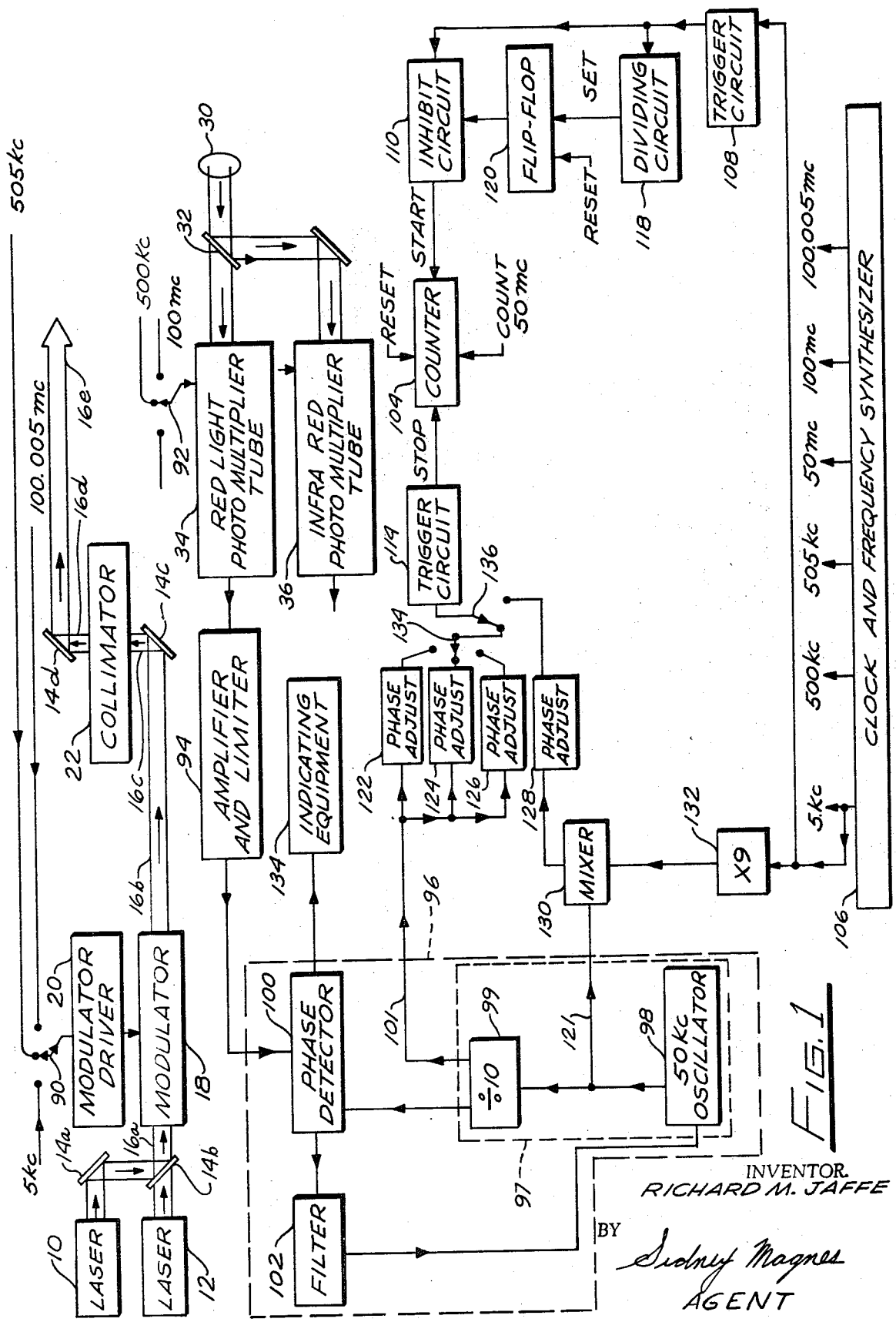
Figure 2:
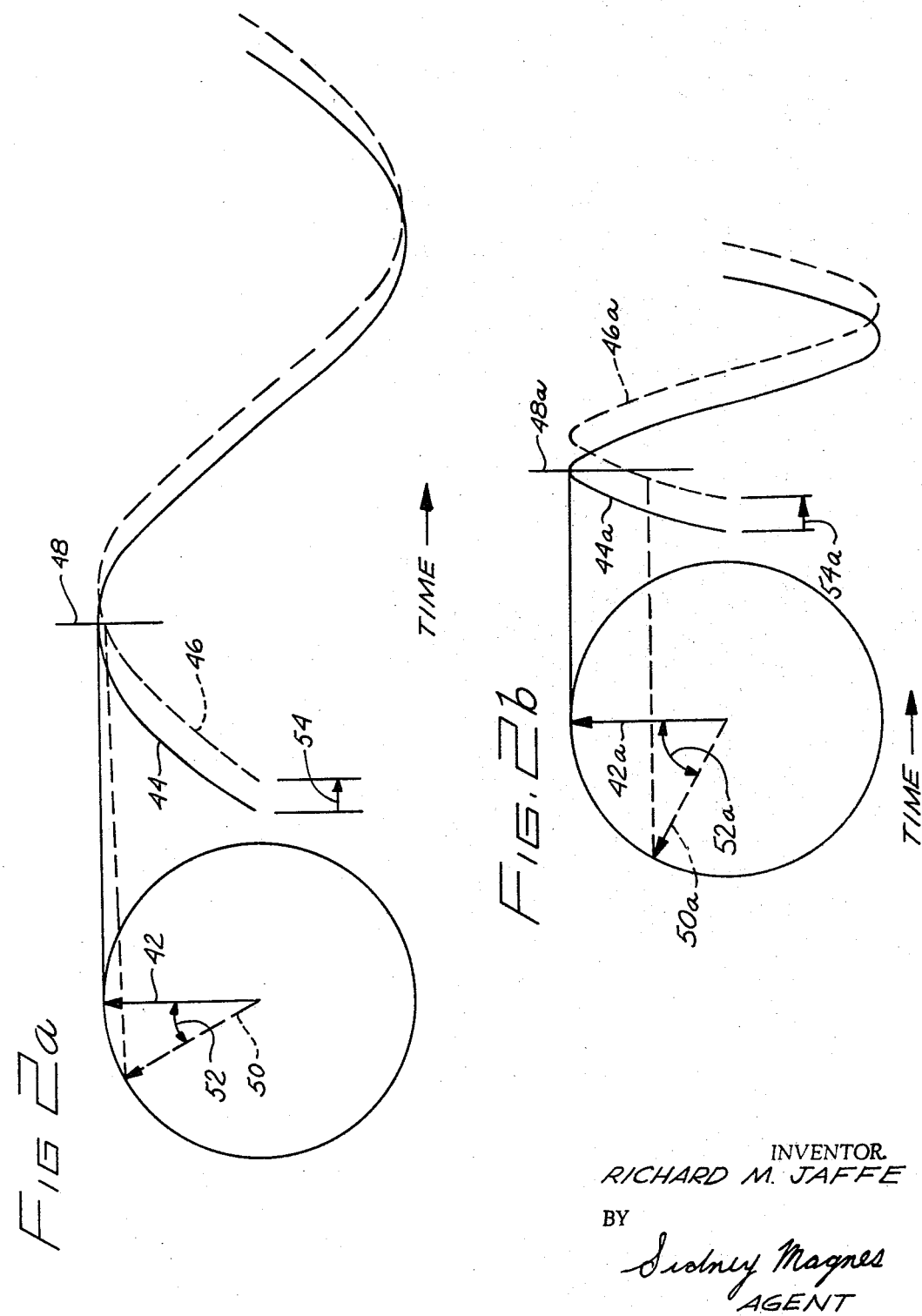
Figure 3:
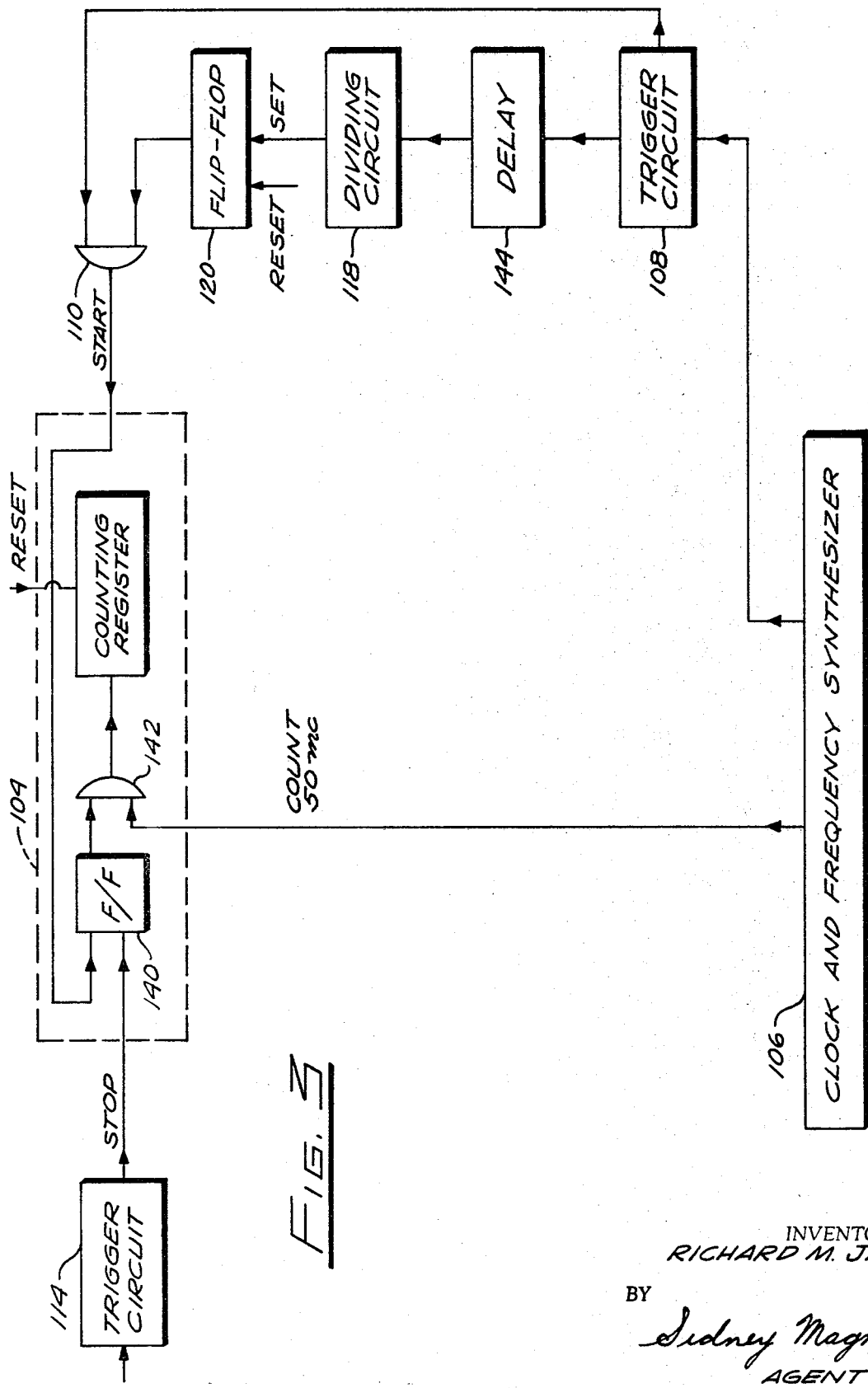

The attainment of this object and others, will be realized from the teachings of the detailed description, taken in conjunction with the drawings of which FIG. 1 shows a schematic diagram of optical and electronic equipment for achieving the above objects;

FIGS. 2a and 2b show various waveforms used in explaining the operation of the invention; and FIG. 3 shows details of a portion of the schematic diagram.

BACKGROUND

It is well known that the distance between selected points can be measured in a number of ways; and one way of measuring these distances is to use a phase-difference measurement technique; i.e., to "modulate" (to be discussed later) a beam of light from a light-source, such as a laser; to direct the modulated lightbeam to a mirror mounted at the point whose movement is to be detected; to catch the reflected modulated lightbeam; and to then compare the modulations of the reflected lightbeam with "reference" modulations, i.e., measure the phase-difference.

In general, as long as the mirror is stationary, the reference modulations and the modulation of the reflected lightbeam will have a particular phase relationship; but as soon as the mirror moves, the modulations will have a different phase relationship—and the amount of movement can be obtained from the change in the modulation relationship.

Unfortunately, however, the air between the measuring station and the mirror is quite turbulent, and in constant movement; so that its light-transmitting effect, which may be called its "index-of-refraction" is constantly changing—and the changing index-of-refraction affects the outgoing and reflected lightbeams. As a result, therefore the final modulation phase-relationship is a function of two variables, i.e., it depends upon (1) the changing index-of-refraction of the atmosphere, and (2) possible movement of the mirror. Thus, mirror-movement may be masked by a changing index-of-refraction of the atmosphere.

It has been found that by using two lightbeams of different frequency (color), the effect of the instantaneous index-of-refraction may be measured; so that the distance and smaller changes of distance can be readily detected and accurately measured—provided that smaller phase-differences may be detected and measured.

SYNOPSIS

The present invention relates to a distance measuring system based on the measurement of phase-differences; and to precise movement of extremely small phase-differences of signals that may have a high-frequency. The disclosed embodiment of the invention uses a counter to measure the phase-difference, or time-interval, between a reference-signal and a corresponding portion of a subject waveform. For convenience, the subject waveform—which may be badly distorted—is replaced by a comparison-signal that may be obtained from a phase-lock loop. A phase-multiplied secondary comparison-signal is obtained by using a higher-frequency-than-necessary oscillator in the phase-lock loop; and the secondary comparison-signal provides increased phase-measurement accuracy.

DESCRIPTION

An embodiment of the present invention for achieving the desired phase-measurement is shown schematically in FIG. 1. Here (for reasons to be more fully explained subsequently) two light-sources, such as lasers 10 and 12, produce lightbeams of different frequency (or color) —such as red light and infrared light.

The lightbeams from lasers 10 and 12 are combined, as indicated by mirrors 14a and 14b; and the composite lightbeam 16a is directed to a modulator 18—such as a Pockel-cell modulator or the AM4 Optical Modulator manufactured by North American Aviation, Inc.—that "amplitude modulates" the composite lightbeam. Broadly stated, the amplitude modulation causes the intensity of the lightbeam to vary, under the influence of a modulating-signal from modulator-driver 20. In an extreme case of amplitude modulation, the lightbeam would be chopped into bursts of light and darkness; but, in this case, the amplitude of lightbeam 16a is modulated so that its intensity (amplitude) increases and decreases sinusoidally a given amount at a given modulation-frequency. The modulation-frequency will be further discussed subsequently.

The modulated composite lightbeam 16b from modulator 18 is directed, by means such as a mirror 14c, to a collimator 22; and is then directed as an outgoing collimated lightbeam 16e to the location (not shown) whose distance and/or movement is to be detected and/or measured.

At that location, a retro-reflector (which may be one, or many, of the well known corner mirrors) reflects the modulated lightbeam back to the receiving station, as indicated by the incoming lightbeam 30 of FIG. 1. Incoming lightbeam 30 is directed—by suitable optical means—to a beam-splitter 32, which may be a dichroic mirror, that directs the red light-component of lightbeam 30 to a red-light photomultiplier tube 34, and directs the infrared light-component of lightbeam 30 to an infrared-light photomultiplier tube 36. The photomultiplier tubes 34 and 36 convert the impinging red light-component and infrared light-component into electrical signals whose intensity-variations and frequencies correspond to the intensity variation and frequency of the modulations on these light-components in incoming-lightbeam 30. A subsequent discussion will explain why these modulations are different, and their significance.

A slight digression becomes necessary at this point, in order to discuss the modulation-signal, its frequency, its effect, and its usefulness in distance measurement. It is well known that the intensity and polarity of an electrical signal may vary at a desired frequency; for example, the usual electricity provided by a commercial power station varies at the rate of sixty cycles per second —whereas the electricity provided by an airplane power generator generally varies at the rate of four-hundred cycles per second. It is also known that each frequency has an inherent "wavelength" associated with it, the wavelength becoming shorter as the frequency increases.

It is known, moreover, that these frequencies and wavelength may be visualized in different ways; and FIG. 2 shows two related ways of visualizing the electric signals. In FIG. 2a, solid line 42 (which may be called a "vector") may be visualized as rotating clockwise in the manner of a wheel-spoke; its rotational rate (revolutions per second) corresponding to the frequency (cycles per second) of the electrical signal. As solid-line vector 42 rotates, its outer end cyclically varies above and below the hub of the imaginary wheel; and if the instantaneous positions of the vector's outer end are plotted—against time—in the form of a graph, they produce the solid-line waveform 44 known as a "sinewave." The distance between the beginning and the end of one cycle of the sinewave corresponds to the previously discussed wavelength. Thus, the solid-line waveform 44 may be visualized as one cycle of an electrical signal that is varying at a given frequency.

Referring back to FIG. 1, it will be recalled that as the light from lasers 10 and 12 are passed through modulator 18 in the form of a combined lightbeam, the intensity of the exiting combined lightbeam 16b varies at a frequency and amplitude controlled by the modulating-signal from modulator-driver 20; thus producing a result similar to solid-line waveform 44 of FIG. 2a. The lightbeam itself is known as the "carrier," and the variations of the carrier are known as the "modulations."

Assume, for simplicity, that a single monochromatic lightbeam is modulated with a modulation-signal having a particular (but presently undefined) wavelength; and that a particular (but presently undefined) path-length exists for this emitted and reflected lightbeam. At the receiving station, the modulation on the reflected lightbeam is compared (in a manner to be discussed later) with the modulating-signal. As a result of the above assumptions, each portion of the reflected lightbeam modulation may exactly match time-wise, with a corresponding portion of the modulating-signal. This exact-match condition is known as an in-phase relation. Under these assumed conditions, the wavelength (which can be calculated from the modulation frequency) is equal to the path-length—which may therefore be "measured" in this way.

Assume now that the reflector moves slightly, so that the emitted and reflected lightbeam traverses a slightly different path-length. As a result, the reflected lightbeam modulation no longer exactly matches the modulating-signal; and this out-of-phase condition is also portrayed in FIG. 2a.

As previously indicated, the solid-line waveform 44 may represent the modulating-signal; and the dashed-line waveform 46 may represent the out-of-phase modulation of the reflected lightbeam. It will be seen from FIG. 2a that if the two waveforms 44 and 46 do not match—i.e., are not in-phase; and if they are compared at a given instant, as indicated by line 48, there will be a difference in the amplitudes of their modulations at that particular instant, that is, there will be a phase-difference.

Since the amplitude-difference varies with the portion of the waveforms being compared, this phase-difference is preferably expressed as a "phase-angle" 52 between the solid-line vector 42 and the dashed-line vector 50.

The "lagging-phase-angle" condition portrayed in FIG. 2a would be produced by an increased distance, indicated by reference character 54; that is, if the retro-reflective mirror moved away from the measuring station. If the mirror had moved farther away, the distance represented at 54 and by phase-angle 52 would be larger; whereas if the mirror had moved closer to the measuring station, the distance represented at 54 would have been to the left, and the "leading-phase-angle" condition would have placed phase-angle 52 clockwise of line 42. Thus, the distance and direction of mirro-movement is indicated by phase-angle 52.

It will be realized that a complete revolution of vector 42 corresponds to one wavelength; so that a given phase-angle 52 represents a given portion of a wavelength, or—stated in another way—phase-angle 52 represents a distance. Therefore, the previously discussed in-phase condition is not essential for distance measurement. Instead, a knowledge of the wavelength used, and of the phase-angle, permits one to compute the distance by noting the deviation from the in-phase condition and adding (or subtracting) the distance corresponding to the phase-angle. The accuracy depends, to a great extent, upon the accuracy of the phase-angle measurement.

Thus, two modes of operation may be used for distance measurements. (1) The modulation-signal frequency may be continuously variable to provide in-phase conditions for a variety of distances; or (2) selected frequency modulation-signals may be used, that—taken in conjunction with phase-angle measurements—provide out-of-phase conditions that permits computation of the distance.

Referring now to FIG. 2b, it will be seen that this also represents the modulating-signal and the modulations of the reflected lightbeam; corresponding portions being similarly numbered, except that in FIG. 2b they now have the suffix "a." In FIG. 2b the modulations have a higher frequency, and therefore a shorter wavelength than the situation previously discussed. FIG. 2b represents the same change 54 in optical path-length; but, because of the higher frequency and shorter wavelength of the modulating-signal, the same change of distance is now represented by a larger phase-difference and phase-angle 52a.

It is well known that a large phase-angle such as 52a of FIG. 2b is more easily measured than a small phase-angle such as 52 of FIG. 2a. Therefore, in order to measure small changes of the optical path-length, it is advantageous to use a modulating-signal of a very high frequency—having a shorter wavelength—as illustrated in FIG. 2b.

The use of a short wavelength has another advantage. Since the phase-angle may represent three-hundred-and-sixty degrees, a one-degree phase-angle represents 1/360 of a wavelength. Thus, if the modulating wavelength were twenty miles long, a one-degree phase-angle would represent about three hundred feet. Therefore, the path-length might change two-hundred feet; and the monitoring station could not detect the difference. If, however, the modulating wavelength were ten feet long, a one-degree phase-angle would represent about one-third of an inch; and a minute change in path-length could be detected. It should be realized that the lightbeam is reflected, so that a one-inch path-length change corresponds to a one-half inch mirror movement.

Referring back to FIG. 1, modulator 18 therefore preferably uses a variety of modulating-signals; and the discussions will therefore be presented in terms of three modulating-signal, typically 5 kc., 505 kc., and 100.005 mc.— the low-frequency long-wavelength signals being useful for measuring large distances, and the high-frequency short-wavelength signals being useful for measuring extremely small changes in optical path-length.

Another digression becomes necessary at this time. It will be realized that as a lightbeam travels from its point of origin to a mirror that may be as much as ten miles away, and then travels back to its receiving station, the lightbeam in its twenty-mile round trip will be exposed to some areas where the air is turbulent, to other areas where the air may be moving up and down, and to still other areas where the air will be blowing crosswise in the form of a wind. All of these different air movements, as well as temperature variations, affect the transmission of the lightbeam; and the sum total of these disturbances may be considered as causing "index-of-refraction changes" of the air over this particular path. It should be also noted that many of these disturbances are momentary and changeable, so that the index-of-refraction over this path may change from time-to-time.

The changes of the index-of-refraction effectively change the optical path-length; thus introducing the following problem. Assume that at the receiving station, the reflected lightbeam indicates that its modulation has experienced a phase-shift. The question then arises as to whether the phase-shift was caused by an actual movement of the mirror, or by a change of the index-of-refraction of the optical path.

It can be shown that for technical reasons (which may be stated as having a single equation containing two variables) this problem can be approximated, but not solved with a single lightbeam. However, by the use of two lightbeams having different frequuncies (colors), the problem may be solved because each frequency (or color) of light has its own individual index-of-refraction during the transmission along the optical path. Technically speaking, this two-beam arrangement provides two equations containing two variables; so a solution is now possible.

Since a given instantaneous atmospheric condition produces a different instantaneous index-of-refraction for each light-component, each light-component has a different optical path-length ($P_1$, $P_2$) for the same length (L) of physical distance; the differences between the optical path-lengths and the physical distance being designated $S_1$ and $S_2$ ($S=P-L$, or $P=L+S$). Because each light-component traverses an optical path of a different length, the phases of the reflected light-components are different at the receiving station; and analyzing the resultant phase relations provides index-of-refraction and distance information. A more complete theoretical discussion will be found in the above-cited copending patent application.

The above cited patent application discusses the importance of measuring the phase-differences; and the instant patent application discloses a system for measuring small phase-differences.

Referring back to FIG. 1, the output signals from photomultiplier tubes 34 and 36 contain information about the phase of the modulation on the reflected red and infrared light-components; and FIG. 1 shows a digital phase-meter for measuring small phase angles. It should be noted that because the combined red and infrared lightbeam was modulated by a common modulator-signal in modulator 18, the modulations of both the red and infrared reflected light-components have the same frequency as the modulation-signal; but, because of the index-of-refraction problem mentioned above, the timewise state of the modulation impinging onto photomultiplier tube 34 will be somewhat different than the timewise state of the modulation impinging onto photomultiplier tube 36.

In summation, to this point, it has been explained that a composite two-component lightbeam 16a, such as may be obtained from a pair of lasers, is applied to a modulator 18 that is excited by a modulator-driver 20; the modulated composite exiting lightbeam 16b being directed to a retro-reflector, and being reflected as modulated composite lightbeam 30. A beam-splitter 32 splits incoming lightbeam 30 into two light-components; and directs one light-component to photomultiplier tube 34, and directs the other light-component to photomultiplier tube 36, the modulations of the lightbeams impinging onto the photomultiplier tubes being factors whose phase relation is to be measured.

The output of each photomultiplier tube 34 and 36 is treated in a similar manner; so a detailed description of the operation from this point on will be given in terms of the output of photomultiplier tube 34—it being understood that circuitry (not shown) identical to that to be described is provided for processing the output of tube 36.

It will be recalled that the exiting lightbeam was modulated in order to measure distance and minute movement; and that this modulating was done by means of modulating-signals from a modulator-driver 20 operating on modulator 18. Continuously-varying-frequency modulating-signals may be used, but in FIG. 1, one of a plurality of signals having different fixed frequencies—as for example 5 kc., 505 kc., and 100.005 mc.—is used as the modulating-signal. The selected modulating-signal is applied, by means of switch 90, to modulator 18; so that the exiting composite lightbeam 16b may be modulated at a desired frequency.

In order to select a convenient frequency for subsequent circuitry, a heterodyning-signal is applied to one of the dynodes of the photomultiplier tube; this being accomplished by means of a switch 92, which is preferably ganged with switch 90, to select a heterodyning-signal having a frequency that is typically 5 kc. lower (or higher) than the modulating-signal impressed upon the exiting lightbeam. Typical heterodyning frequencies are illustrated as being 100 mc. and 500 kc. (no heterodyning at the photomultiplier is used when modulation is at 5 kc.). In this way, the difference between the selected modulating-signal on the reflected light-component and the selected heterodyning-signal is always 5 kc. (5 kc.–0 kc., 505 kc.–500 kc., 100.005 mc.–100.000 mc.), so that in every case the output from photomultiplier tube 34 is a convenient-frequency 5 kc. heterodyned signal that varies in accordance with the modulation of the light-component impinging onto photocell 34. Alternatively, if the modulating-signal had been of a continuously varying frequency, the heterodyning-signal would have a continuously varying frequency that is 5 kc. removed from the modulating-signal frequency.

It is known that the heterodyning process retains the phase-angle; but a short discussion of this point may be helpful. Assume that the outgoing lightbeam is modulated by a given modulating-signal, say one having a frequency of 505 kc. Assume further that due to atmospheric conditions, a returning light-component has a given lagging phase-angle relative to the modulating-signal. At the photomultiplier tube 34, a heterodyning-signal having a frequency of 500 kc. is introduced; so that the output of the photomultiplier tube is a heterodyned electrical signal of 5 kc. (505 kc.–500 kc.) having the same lagging phase-angle relative to the modulating-signal. Thus, the given phase-angle is retained in a lower-frequency heterodyned signal.

It has been found desirable to pass this 5 kc. heterodyned-signal, from the photomultiplier tube, through a high-gain amplifier and limiter 94 that does not introduce any phase shift, in order to assure the availability of a subject phase-shifted signal of suitable and constant amplitude. While this amplified and limited signal could be used directly for phase-comparison purposes, it may be badly shape-distorted; and it has been found advantageous to use a new clean comparison-signal. Therefore the basic comparison-signal output of amplifier-limiter 94 is applied to a phase-lock loop 96, in order to provide a clean constant amplitude phase-locked "primary" comparison-signal.

The operation of phase-lock loops is well known. Basically they compare an incoming signal with the output of a variable frequency oscillator, in order to detect any phase difference; and the resultant phase-difference signal is used as an error-signal that varies the frequency of the variable oscillator to lock it to the incoming signal. In this way a clean, stable, constant amplitude phase-locked comparison-signal is generated.

In phase-lock loop 96, a 5 kc. primary comparison-signal—that is phase-locked to the basic comparison-signal from amplifier 94—is to be produced; but, for reasons to be discussed later, a higher-frequency-than-needed signal is generated. Specifically, phase-lock loop 96 comprises a variable frequency signal-generator 97 that has a 50 kc. oscillator 98 and a divide-by-ten circuit 99—so that the output-signal of generator 97 has the desired 5 kc. frequency (50 k.÷10); and is phase-locked to the convenient-frequency heterodyned 5 kc. basic comparison-signal from amplifier 94. This 5 kc. output signal from generator 97 is applied to phase-detector 100, where it is compared with the 5 kc. convenient-frequency signal from amplifier 94. The output of phase-detector 100 acts as an error-signal that traverses filter 102 to be applied to, and to effect control of, variable oscillator 98. Thus, oscillator 98 is locked to the phase of the incoming signal; and generator 97 thus provides a clean reliable 5 kc. comparison-signal over wire 101.

It should be noted that prior-art phase-detectors, as indicated by reference character 100, produce an error-signal corresponding to the phase between two signals; but for applicant's purpose this error-signal cannot be measured accurately enough over the desired range of values to provide the desired information for conversion into distance and change-of-distance measurements.

The disclosed digital phase meter of FIG. 1 measures the phase-angle by using a different concept; namely that of counting during the out-of-phase interval. This phase-measuring counting concept utilizes a counter 104 that is started by a selected portion of a 5 kc. gating-signal from a clock and frequency-synthesizer 106, and is stopped by a corresponding portion of the comparison-signal from phase-lock loop 96; the counter counts pulses provided from frequency-synthesizer 106 at 50 mc. Thus, the phase-difference between these two signals shows up as a tally on the counter.

This phase-difference count is accomplished as follows. Clock and frequency synthesizer 160 produces clock-pulses and signals having predetermined frequencies, typically 5 kc., 500 kc., 505 kc., 50 mc., 100 mc., and 100.005 mc.; all the signals being phase coherent. Some of these signals were used in the modulator-driver 20 and in the heterodyning process at the photomultiplier tube.

Typically, one of the signals, in this case the 5 kc. signal from frequency-synthesizer 106, is used as a reference or gating-signal; and is applied to a trigger-circuit 108 that produces a trigger-signal—by suitable biasing—when the 5 kc. gating-signal crosses its zero value in a positive-going direction—controlled by a suitably-poled diode. The output of trigger circuit 108 passes through a normally transmitting "inhibit" circuit 110 (to be discussed later), and is used to start counter 104. Counter 104 thereupon starts counting at a predetermined rate—controlled by the 50 mc. signal from the frequency-synthesizer—at the beginning of every 5 kc. gating-cycle.

It should be noted that the 5 kc. gating-signal is capable of starting a new counting cycle approximately every 0.2 millisecond; and that the counter, operating at 50 mc., can count up to about 10,000 counts in 0.2 millisecond. This accounts for the digital phase-meter's ability to measure high-frequency phase-angles with a high sensitivity.

Returning now to the phase lock loop 96, the primary comparison-signal from generator circuit 97 is applied over wire 101 to phase-adjustment circuits (to be discused later), and thence to a trigger-circuit 114 that produces a trigger-signal when the comparison-signal has a value of zero, and is positive-going. The output of trigger-circuit 114 is used to stop the operation of counter 104. Thus, in the disclosed circuit, the gating-signal starts the counter, and the comparison-signal stops the counter; but these functions may, of course, be reversed.

Assume for the moment that 5 kc. primary comparison-signal—as obtained from phase-lock loop 96—is exactly in phase with the 5 kc. gating-signal obtained from frequency-synthesizer 106 (which, because of its phase-coherency operation, assures phase-coherency between the 5 kc. gating-signal and the modulating and heterodyning signals). In this exactly-in-phase condition, the 5 kc. gating-signal and the 5 kc. comparison-signal will each cross its zero value in a positive-going direction at substantially the same instant. The net result is that trigger-circuit 108 starts counter 104, and trigger-circuit 114 stops counter 104 at practically the same instant. Therefore, counter 104 shows a very small tally, if any at all. This counting operation can be repeated for every 5 kc. gating-cycle.

If the remotely-positioned retro-reflector were to more away from the monitoring station, the modulations of the reflected lightbeam would occur later (have a lagging phase-angle), as previously discussed. As a result, in the circuit of FIG. 1, counter 104 would be started at its normal time, but now would be stopped soon after it started counting. Counter 104 would therefore show a low tally; and this operation could be repeated for every 5 kc. gating cycle.

If, on the other hand, the remotely-positioned retro-reflector were to move toward the monitoring station, the modulations of the reflected light-beam would occur earlier (have a leading phase-angle), as previously discussed. In this case, counter 104 would be started at the beginning of a 5 kc. gating-cycle as explained above; but would count for almost the full duration of the 5 kc. cycle, before it was stopped. This operation, too, could be repeated for every gating-cycle. Thus, a receding retro-reflector produces a small or increasing tally, and an approaching retro-reflector produces a large or a decreasing tally. In this way, the type of tally, and changes therein, indicate the type and amount of mirror movement.

Under the above conditions, a tally is produced for very 5 kc. gating-cycle, or every 0.2 millisecond; the maximum tally per cycle being about 10,000 counts per gating-cycle. Tallys produced at this rapidity or for such a short time interval may, of course, be recorded. However, as previously indicated, air turbulence may cause these tallys to vary; so an averaging technique is desirable at times.

Averaging is achieved as follows. The 5 kc. gating-signal from frequency-synthesizer 106 and trigger-circuit 108 is applied to a selectively variable dividing-circuit 118. By suitably setting dividing-circuit 118 to divide by values such as one, two, five, ten, one-hundred, etc., it will produce an output signal after the first, second, fifth, tenth, hundredth, etc., 5 kc. gating-signal trigger-signal. This output signal sets a flip-flop circuit 120, whose output signal causes inhibit-circuit 110 to inhibit the passage therethru of subsequent start-signals from trigger circuit 108.

Under this averaging mode of operation, a counter-start signal from trigger-circuit 108, followed by a counter-stop signal from trigger-circuit 114, occurs every 5 kc. gating cycle—the tallys being accumulated by counter 104. At the end of a predetermined interval—controlled by dividing-circuit 118—an output signal from the dividing-circuit 118 activates inhibit-circuit 110 so that it does not permit counter-start signals from circuit 108 to traverse inhibit-circuit 110 to reach the counter. Therefore, counter 104 does not start again, and shows—and holds—the tally accumulated during the predetermined interval. This arrangement permits the accumulated tally to cover a predetermined number of 5 kc. gating cycles, rather than the uncontrolled number of 5 kg. gating-cycles previously described; and thus provides a total that can be meaningfully averaged over this predetermined time interval. At the end of the predetermined counting interval, counter 104 and flip-flop 120 (and thus inhibit-circuit 110) are reset and cleared; and another counting operation is initiated.

If dividing-circuit 118 is set to divide by "one," a single phase-reading is obtained; and this may be studied, recorded, used for computations, etc., before the equipment is reset.

It should be noted that even though the phase-angle is measured between a gating-signal and a comparison signal, these have the same phase-angle that is present between the modulations on the outgoing and reflected light components.

FIG. 3 illustrates one way of mechanizing the averaging circuitry. As is well known, an AND circuit is one wherein an output signal is produced when two or more input signals are applied simultaneously; and a flip-flop ($F/F$) circuit is one wherein a circuit "flips" to one state to produce a first output signal, and then "flops" to a second state to produce a second output signal. Circuitry of these types are illustrated in FIG. 3, wherein counter 104 comprises a $F/F$ circuit 140 to which the counter-start and counter-stop signals are applied.

A counter-start signal causes $F/F$ 140 to apply a continuous enabling-signal to AND circuit 142. The simultaneous presence of the enabling-signal from $F/F$ 140 and the 50 mc. counting signals from synthesizer 106 causes counter 104 to operate in its counting mode. Contrariwise, a counter-stop signal causes $F/F$ 140 to remove the enabling signal from AND circuit 142. In this case, the lack of simultaneous input signals at AND circuit 142 prevents the counter 104 from operating in its counting mode.

Inhibit-circuit 110 may also be an AND circuit, which transmits a counter-start signal when two input signals are applied simultaneously; the two input signals to inhibit-circuit 110 being the trigger-pulses from trigger-circuit 108, and the continuous enabling signal from $F/F$ 120. For the purpose of this explanation, it may be said that the normal state of $F/F$ 120 makes inhibit-circuit 110 normally conductive.

As explained previously, counter 104 is started by trigger-pulses from trigger-circuit 108; these being applied directly through the normally-conductive inhibit-circuit 110 to the start-terminal of counter 104. Thus, counter 104 is started by start signals resulting from the operation of trigger-circuit 108, and is stopped by stop-signals resulting from the operation of trigger-circuit 114.

During the averaging process, the trigger-pulses from trigger-circuit 108 are also applied to dividing-circuit 118. Circuit 118 produces an output signal only at the end of its dividing operation. The output of the dividing-circuit being applied to $F/F$ 120; thus changing the state of $F/F$ 120, and terminating the enabling-signal applied to inhibit-circuit 110. The termination of the enabling-signal, in turn, terminates the condition of simultaneous input signals at AND inhibit-circuit 110; so that this circuit now inhibits the passage of counter-start signals. In this way, setting dividing-circuit causes it to produce an output signal after a predetermined number of cycles; its output signal effectively stopping the counting operation at that time. To resume operation, $F/F$ 120 is reset to again produce an enabling-signal; and counter 104 is reset, or cleared.

Assume that the circuitry is to average ten cycles, so that inhibit-circuit 110 is to be made non-conductive at the end of the tenth trigger-pulse from trigger-circuit 108. It is known that there is a slight inherent delay in dividing-circuit 118 and $F/F$ 120, so that the output of $F/F$ 120 will be applied to inhibit-circuit 110 later than the "direct" tenth pulse from trigger-circuit 108. If this inherent delay is not long enough, the tenth trigger-pulse may be inhibited by circuit 110; and to prevent this condition, a delay-circuit 144 may be inserted into the averaging circuitry.

Attention is directed to the fact that a possible phase-angle of 360 degrees may be divided into about 10,000 parts; so that a corresponding wavelength is also divided into about 10,000 parts. Thus a $6 \times 10^7$-meter wavelength corresponding to a 5 kc. modulating-signal can be divided into about 6,000 one-meter units; a $6 \times 10^5$-meter wavelength corresponding to a 505 kc. modulating-signal can be divided into about 60 one-meter distances; and a three-meter wavelength corresponding to a 100.005 mc. modulating-signal can be divided into about 10,000 parts. In the latter case, each count represents 0.3 mm. Due to the reflection discussed above, each count represents a mirror movement of one-half unit, or in the latter case—about 0.15 mm.—ignoring air turbulence.

Since the system contains two photocells 34 and 36; each produces a count corresponding to a phase-angle of its impinging light-component; and the above-cited copending patent application teaches how the results may be used to compute the effects of air turbulence, and thus provide increased-accuracy distance-measurements.

It has been found that even more precise measurements, which are always desirable, can be obtained by the following technique. It is known that for an arbitrary reference-signal, the relation of a subject signal to this arbitrary reference signal may be stated as follows.

$$A = \omega + \phi$$

wherein $\omega$ represents the frequency of the subject signal, and $\phi$ represents the phase relation between the subject signal and the arbitrary signal. If now, the subject signal is frequency-multiplied by a factor, say of ten, the new given signal may be expressed as follows.

$$A' = 10\omega + 10\phi$$

It will be seen from this equation that the phase relationship $\phi$ has been multiplied by a factor of ten. Stated in another way, if the original subject signal had a phase relation of one degree relative to the arbitrary reference signal, the frequency-multiplied subject signal would now have a phase relation of ten degrees relative to the reference signal.

The circuit of FIG. 1 takes advantage of this multiplied phase-relation, as follows. It was previously pointed out that phase-lock loop 96 comprised an oscillator 98 that produced a 50 kc. signal that was divided by ten in order to produce a primary comparison-signal at a frequency 5 kc. In order to take advantage of the multiplied phase relationship discussed above, FIG. 1 shows that a second signal is taken directly from the 50 kc. oscillator 98 over wire 121; it being recalled that the phase-relation of this second signal is ten times as great, compared to the modulating-signal, as the phase-relation of the primary comparison-signal obtained from the divide-by-ten circuit 99.

The 50 kc. output of oscillator 98 is mixed, in mixing circuit 130, with a 45 kc. signal, which is obtained by multiplying the 5 kc. reference-signal by a factor of nine, in a multiplying circuit 132. Multiplying circuits are well known; and may comprise a resonant circuit tuned to the desired harmonic, a crystal turned to the desired harmonic, a phase-lock loop similar to 96, etc. In mixing the 50 kc. second signal from oscillator 98 with the 45 kc. signal from multiplier 132, a difference signal of 5 kc. is produced, the original multiplied phase-angle being retained in the mixing operation; and this multiplied-phase secondary comparison-signal from mixer circuit 130 is now ten manner previously described.

Due to the fact that the phase difference of the secondary comparison-signal from mixer circuit 130 is now ten times as great as that of the primary comparison-signal from divide-by-ten circuit 99, counter 104 will operate for a time interval that is ten times as long, before it is stopped; this being for one cycle of the 5 kc. gating-signal. It should be noted that this is not an averaging effect, as obtained by the previously-described use of dividing-circuit 118; but is a higher-precision result. Even higher precision may be obtained by introducing a phase multiplication of one hundred or more, up to the point where the time-interval approaches the duration of the 5 kc. gating-cycle.

The above-described technique provides the distance between the modulator, the retro-reflector, and the photomultiplier tube; but, preferably, the distance to be measured extends from a so-called "bench-mark" that comprises a marker partly buried in the ground. Since it is impracticable to position the equipment precisely over the benchmark, the following calibration procedure is used. The equipment is positioned on an extension of the line between the remote location and the bench-mark; and the distance between the equipment and the bench-mark is obtained by placing a retro-reflector above the benchmark. However, since this actual distance is not important (where a particular application such as earthquake prediction requires measurement of distance changes only), it may be "nulled out" in the following manner.

To do this, the bench-mark retro-reflector is used as previously described, i.e., to reflect a modulated composite lightbeam back to the monitoring station. Rather than measuring the distance however, phase-adjusters 122, 124, 126, and 128 are adjusted to give a normal in-phase tally for the particular modulating frequency used—the phase adjusters being variable-delay units that adjust the phase of the comparison-signal. Once the normal in-phase tally is achieved, the bench-mark retro-reflector is removed; and the new tally corresponds with the distance to be measured.

It should be noted that switches 90, 92, and 134 are ganged together, so that a single switch setting selects a corresponding modulating-signal, heterodyning-signal, and phase-adjuster. It should also be noted that switch 136 permits the choice of a primary comparison-signal (for low resolution) or a phase-multiplied secondary comparison-signal (for high resolution).

For convenience of the operator, indicating equipment 134, which may provide an audible or a visible indication—is activated when the error-signal of phase-lock loop 96 drops below a given threshold. This indication advises the operator that lock-on has been achieved, and that a meaningful count is being tallied.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:
1. Distance-measuring equipment comprising:
means for converting said modulated beams into signals lated radiation of distinctly different frequencies, over the same geometrical path of a propagating medium;
means for transmitting first and second beams of modu corresponding to the phase of modulation for each beam at a given point of said path;
a counter;
means for producing a gating signal;
means for applying said gating and converted signals to the counter to indicate phase of said converted signals—whereby the component of path-length, due to conditions of the propagating medium may be determined.

2. The combination of claim 1 including:
means for producing a phase-multiplied comparison-signal; and
means for substituting said phase-multiplied comparison-signal for said converted signal applied to said counter.

3. Distance-measuring equipment comprising:
means for transmitting first and second light-beams of modulated radiation of distinctly different frequencies, over the same geometrical path of a propagating medium;
photo-sensitive means for converting said modulated means into electrical light-beam signals corresponding to the phase of modulation for each beam at a given point of said path;
a counter;
means for producing a gating signal;
means for applying said gating and converted signals to the counter to indicate the phase of said converted signals;
means for applying said light-beam signal to said phase-lock loop for producing a primary comparison-signal and a secondary phase-multiplied comparison-signal; and means
means for substituting one of said comparison-signals for said light-beam signal applied to said counter.

4. The combination comprising:
(A) generating means for producing a gating-signal, a plurality of modulating-signals, and a plurality of heterodyning signals having a fixed frequency difference compared with corresponding modulating signals;
(B) means for producing a composite lightbeam having at least two light-components of different frequencies;
(C) means for impressing a selected modulating-signal onto said composite lightbeam;
(D) means for transmitting said modulated composite lightbeam through a propagating medium;
(E) means for receiving the modulated composite lightbeam at a given point in said propagating medium, and converting said received modulated composite lightbeam into received modulated light-components;
(F) photocell and heterodyning means, cooperatively associated with said photocell, for utilizing a corresponding portions of said information-bearing comvidual information-bearing comparison-signals at a frequency lower than the frequency of said modulating-signal, corresponding to the modulations of said received modulated light-components; and
(G) counter means, triggered by said comparison-signal and said gating-signal, for measuring the phase-relation of said individual information-bearing comparison-signals.

5. The combination of claim 4 wherein limitation (G) comprises
means for measuring the time interval between corresponding portions of said information-bearing comparison-signal and said gating-signal.

6. The combination of claim 4 including means, such as a phase-lock loop, for producing a primary comparison-signal and a phase-multiplied secondary comparison-signal, said comparison-signals having fixed phase-relations with said heterodyned information-bearing comparison-signal; and means for applying a selected one of said comparison-signals to said counter.

7. The combination comprising:
   (A) generating means for producing a gating-signal, a plurality of modulating-signals, and a plurality of heterodyning signals having a fixed frequency difference compared with corresponding modulating signals;
   (B) means for producing a composite light-beam having at least two light-components of different frequencies;
   (C) means for impressing a selected modulating-signal onto said composite light-beam;
   (D) means for transmitting said modulated composite light-beam through a propagating medium;
   (E) means for receiving the modulated composite light-beam at a given point in said propagating medium, and converting said received modulated composite light-beam into received modulated light-components;
   (F) photocell and heterodyning means, cooperatively associated with said photocell, for utilizing a corresponding heterodyning-signal, for producing individual information-bearing comparison-signals at a frequency lower than the frequency of said modulating-signal, corresponding to the modulations of said received modulated light-components;
   (G) counter means, triggered by said comparison-signal and said gating-signal, for measuring the phase-relation of said individual information-bearing comparison-signals.
   (H) means, such as a phase-lock loop, for producing a primary-comparison-signal and a phase-multiplied secondary-comparison-signal, said comparison-signals having fixed phase-relations with said heterodyned information-bearing comparison-signal, said primary and secondary comparison-signal producing means comprising a signal generator having an oscillator and a dividing-circuit connected to the output of said oscillator;
   (I) means for obtaining said primary comparison-signal from the output of said dividing-circuit;
   (J) means for obtaining said phase-multiplied secondary comparison-signal from the output of said oscillator; and
   (K) means for applying a selected one of said comparison-signals to said counter.

8. Apparatus for comparing the phase of a first signal and a second signal, comprising:
means for producing a comparison-signal that is a harmonic having a given factor relative to the frequency of said first signal—whereby the phase of said comparison-signal to said second signal has been multiplied by said given factor;
said comparison-signal producing means comprising phase-lock loop signal-generator means, response to said first signal, for producing the frequency-multiplied comparison-signal;
a phase comparator; and
means for applying said comparison-signal and said second signal to said phase-comparator for comparing the phase of said comparison-signal and said second signal—whereby said multiplied-phase permits improved phase comparison.

9. Apparatus for comparing the phase of a first signal and a second signal, comprising:
a counter;
an inhibit-circuit;
means for applying said first signal through said inhibit-circuit to said counter for causing said first signal to activate said counter—whereby said counter produces a tally for the time interval between its activation and deactivation;
means for applying said second signal to said counter for causing said second signal to deactivate said counter;
a driving circuit;
means for directing said first signal through said dividing-circuit to produce an output after a given number of cycles of said first signal;
means for causing the output signal from said dividing-circuit to disable said inhibit-circuit for preventing said first signals from traversing said inhibit-circuit to said counter, for causing said counter to produce an accumulated tally corresponding to said given number of cycles of said first signal.

10. The combination of claim 9 including
means for producing trigger-signals at corresponding portions of said first and second signals; and
means for causing said trigger-signals to activate and deactivate said counter.

11. Distance measuring equipment comprising:
a pair of lasers producing radiations of different frequencies;
means for combining the light from said lasers into a composite light-beam:
signal-source means for producing a plurality of modulating-signals, heterodyning-signals, and gating-signals;
means for modulating said composite lightbeam;
means for applying one of said modulating-signals to said modulator for producing a modulated composite lightbeam;
means for directing said composite modulated light-beam to a retro-reflector;
beam-separating means for separating the reflected modulated composite lightbeam into its light-components;
photomultiplier means for converting each of said light-components into information-bearing signals;
means for applying a corresponding heterodyning-signal to said photomultiplier means for producing a basic comparison-signal corresponding to the modulation of said reflected light-component;
means for amplifying and limiting said basic comparison-signal;
a phase-lock loop comprising a variable oscillator adapted to oscillate at a frequency that is a given harmonic of said basic comparison-signal, and a dividing-circuit means for dividing the signal from said oscillator to the same frequency as said basic comparison-signal;
means for introducing said basic comparison-signal into said phase-lock loop;
means for obtaining a primary comparison signal from said dividing-circuit means;
means for obtaining a phase-multiplied secondary comparison-signal from said oscillator;
means for obtaining an indicating signal from said phase-lock loop;
indicating equipment;
means for applying said indicating signal to said indicating equipment;
a counter;
means for applying a counting-signal to said counter,
first trigger-circuit means for producing a first trigger-signal when an applied signal has a value of zero in a positive-going direction;

means for applying a gating-signal to said first trigger-circuit;

means for causing the output of said first trigger-circuit to start said counter;

second trigger-circuit means for producing a second trigger-signal when an applied signal has a value of zero in a positive-going direction;

means for applying said primary comparison-signal to said second trigger-circuit;

means for causing the output of said second trigger-circuit to stop said counter;

means for multiplying the frequency of a signal from said signal source;

means for mixing said last signal with said oscillator-signal for producing a phase-multiplied secondary comparison-signal; and means for applying said phase-multiplied secondary comparison-signal to said second trigger-circuit means.

12. The combination of claim 11 including inhibit-circuit means, connected between said first trigger-circuit means and said counter, for applying the output of said first trigger-circuit means through said inhibit-circuit to said counter, for starting said counter;

dividing-circuit means for applying the output of said first trigger-circuit means to said inhibit-circuit means—whereby said dividing-circuit produces an output signal after a given number of signals from said first trigger-circuit means; and means for applying the output of said dividing-circuit means to said inhibit-circuit means for preventing subsequent outputs from said first trigger-circuit means from starting said counter.

13. The combination of claim 12 including a plurality of phase-adjusting delay-line means for adjusting the phase of the primary comparison-signal applied to said second trigger-circuit means, respective phase-adjusting means being adapted for phase-adjusting the comparison-signals corresponding to given modulating-signals; and phase adjusting delay-line means for adjusting the phase of the secondary comparison-signal applied to said second trigger-circuit means.

References Cited

UNITED STATES PATENTS

| | | | |
|---|---|---|---|
| 3,164,661 | 1/1965 | Dellon | 356—5 |
| 3,223,997 | 12/1965 | Clark et al. | |
| 3,229,203 | 1/1966 | Minohara. | |
| 3,243,811 | 3/1966 | Hose. | |
| 3,434,820 | 4/1969 | Thompson, et al. | 356—5 X |

RODNEY D. BENNETT, Primary Examiner

J. G. BAXTER, Assistant Examiner

U.S. Cl. X.R.

343—14